US007922129B2

(12) United States Patent
Rapp et al.

(10) Patent No.: US 7,922,129 B2
(45) Date of Patent: Apr. 12, 2011

(54) CABLE ROUTING DEVICES WITH INTEGRATED COUPLERS

(75) Inventors: David E. Rapp, Eden Prairie, MN (US); Thomas C. Tinucci, Eden Prairie, MN (US); Derek Sayres, Londsdale, MN (US); Thomas L. Barnes, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/941,667

(22) Filed: Nov. 16, 2007

(65) Prior Publication Data

US 2008/0185483 A1 Aug. 7, 2008

Related U.S. Application Data

(63) Continuation of application No. 11/425,625, filed on Jun. 21, 2006, now Pat. No. 7,315,680.

(51) Int. Cl.
*F16L 3/22* (2006.01)

(52) U.S. Cl. ............. 248/68.1; 248/49; 248/65; 248/53; 385/134; 385/135; 385/136; 385/137; 59/78.1; 267/158; 267/160; 403/329; 403/387

(58) Field of Classification Search .................... 248/49, 248/65, 53, 68.1; 59/78.1; 385/134, 135, 385/136, 137; 403/387; 267/158, 160
See application file for complete search history.

(56) References Cited

U.S. PATENT DOCUMENTS

| | | | |
|---|---|---|---|
| 2,316,166 A | 4/1943 | Huguelet | |
| 2,741,499 A | 4/1956 | Kussmaul | |
| 2,821,154 A | 1/1958 | Tennison, Jr. | |
| 2,823,056 A | 2/1958 | Di Meo et al. | |
| 2,834,622 A | 5/1958 | Reeves | |
| 2,880,887 A | 4/1959 | McClurg | |
| 2,891,750 A | 6/1959 | Bergquist | |
| 3,022,972 A | 2/1962 | Bunston | |
| 3,042,351 A | 7/1962 | Du Bois | |

(Continued)

FOREIGN PATENT DOCUMENTS

DE 36 36 412 A1 4/1988

(Continued)

OTHER PUBLICATIONS

International Search Report and Written Opinion mailed Mar. 5, 2008.

(Continued)

*Primary Examiner* — Anita M King
*Assistant Examiner* — Nkeisha J Smith
(74) *Attorney, Agent, or Firm* — Merchant & Gould P.C.

(57) ABSTRACT

A fitting for a cable trough system, the fitting including a bottom wall and side walls extending from at least a first terminal end to a second terminal end and forming a trough therebetween, the side walls being curved in a longitudinal direction, and an end portion formed at each of the first and second terminal ends, the end portion including first and second guiding surfaces defining a space therebetween, and a spring member positioned in the space. The space is sized to receive a terminal end of a trough member of the cable trough system, and wherein the spring member is positioned to engage the terminal end of the trough member to couple the trough member to the fitting. Other cable routing devices can also be used.

5 Claims, 19 Drawing Sheets

U.S. PATENT DOCUMENTS

| | | | |
|---|---|---|---|
| 3,188,030 A | 6/1965 | Fischer | |
| 3,351,699 A | 11/1967 | Merckle | |
| 3,370,121 A | 2/1968 | Merckle | |
| 3,457,598 A | 7/1969 | Mariani | |
| 3,471,629 A | 10/1969 | O'Leary | |
| 3,603,625 A | 9/1971 | Cottrell et al. | |
| 3,782,420 A | 1/1974 | Kolb et al. | |
| 3,875,618 A | 4/1975 | Schuplin | |
| 3,915,420 A | 10/1975 | Norris | |
| 4,099,749 A | 7/1978 | van Vliet | |
| 4,305,236 A | 12/1981 | Williams | |
| 4,854,665 A | 8/1989 | Gagnon | |
| 4,954,015 A | 9/1990 | Mcgowan | |
| 5,035,092 A | 7/1991 | Brant | |
| 5,038,528 A | 8/1991 | Brant | |
| 5,067,678 A | 11/1991 | Henneberger et al. | |
| 5,100,221 A | 3/1992 | Carney et al. | |
| 5,134,250 A | 7/1992 | Caveney et al. | |
| 5,142,606 A | 8/1992 | Carney et al. | |
| 5,161,580 A | 11/1992 | Klug | |
| 5,316,243 A | 5/1994 | Henneberger | |
| D348,651 S | 7/1994 | Henneberger | |
| 5,469,893 A | 11/1995 | Caveney et al. | |
| 5,547,307 A | 8/1996 | Decore et al. | |
| 5,617,678 A | 4/1997 | Morandin et al. | |
| 5,720,567 A | 2/1998 | Rinderer | |
| 5,752,781 A | 5/1998 | Haataja et al. | |
| 5,753,855 A | 5/1998 | Nicoli et al. | |
| 5,792,993 A | 8/1998 | Rinderer | |
| D402,262 S | 12/1998 | Scherer et al. | |
| D402,263 S | 12/1998 | Scherer et al. | |
| 5,917,982 A * | 6/1999 | Vargas et al. | 385/134 |
| D413,306 S | 8/1999 | Scherer et al. | |
| 5,937,131 A | 8/1999 | Haataja et al. | |
| 5,995,699 A | 11/1999 | Vargas et al. | |
| 5,998,732 A | 12/1999 | Caveney et al. | |
| D419,962 S | 2/2000 | Caveney | |
| 6,037,543 A | 3/2000 | Nicoli et al. | |
| D430,543 S | 9/2000 | Rohder | |
| 6,126,122 A | 10/2000 | Ismert | |
| 6,143,984 A | 11/2000 | Auteri | |
| 6,188,024 B1 | 2/2001 | Benito-Navazo | |
| 6,193,434 B1 | 2/2001 | Durin et al. | |
| D447,737 S | 9/2001 | Scherer et al. | |
| 6,402,418 B1 | 6/2002 | Durin et al. | |
| 6,424,779 B1 | 7/2002 | Ellison et al. | |
| 6,427,952 B2 * | 8/2002 | Caveney et al. | 248/68.1 |
| 6,450,458 B1 * | 9/2002 | Bernard | 248/68.1 |
| 6,463,631 B2 | 10/2002 | Noda | |
| 6,470,129 B1 | 10/2002 | Wentworth et al. | |
| 6,476,327 B1 | 11/2002 | Bernard et al. | |
| 6,498,296 B2 * | 12/2002 | Benito-Navazo | 174/68.3 |
| 6,512,875 B1 | 1/2003 | Johnson et al. | |
| 6,523,791 B2 * | 2/2003 | Bernard et al. | 248/68.1 |
| 6,535,683 B1 * | 3/2003 | Johnson et al. | 385/136 |
| 6,559,378 B1 * | 5/2003 | Bernard | 174/481 |
| 6,634,605 B2 | 10/2003 | Bernard et al. | |
| 6,709,186 B2 | 3/2004 | Ferris et al. | |
| 6,715,719 B2 | 4/2004 | Nault et al. | |
| 6,739,795 B1 * | 5/2004 | Haataja et al. | 403/387 |
| 6,810,191 B2 | 10/2004 | Ferris et al. | |
| 6,850,687 B2 * | 2/2005 | Lavoie | 385/137 |
| 6,874,969 B2 * | 4/2005 | Jadaud et al. | 403/92 |
| 7,029,195 B2 * | 4/2006 | Nault et al. | 403/293 |
| 7,093,997 B2 * | 8/2006 | Ferris et al. | 403/293 |
| 7,175,137 B2 | 2/2007 | Ferris et al. | |
| 7,226,022 B2 * | 6/2007 | Bernard et al. | 248/68.1 |
| 7,360,743 B2 * | 4/2008 | Ferris et al. | 248/49 |
| 7,481,597 B2 * | 1/2009 | Beck | 403/387 |
| 2002/0006312 A1 | 1/2002 | Buard | |
| 2002/0096606 A1 | 7/2002 | Bernard et al. | |
| 2002/0170726 A1 | 11/2002 | Mendoza | |
| 2003/0086675 A1 * | 5/2003 | Wu et al. | 385/137 |
| 2003/0183731 A1 | 10/2003 | Ferris et al. | |
| 2003/0183732 A1 | 10/2003 | Nault et al. | |
| 2004/0051007 A1 * | 3/2004 | Bernard et al. | 248/68.1 |
| 2004/0104313 A1 * | 6/2004 | Haataja et al. | 248/49 |
| 2006/0006291 A1 * | 1/2006 | Bernard et al. | 248/68.1 |
| 2006/0029354 A1 | 2/2006 | Follingstad et al. | |
| 2006/0210356 A1 | 9/2006 | Ferris et al. | |
| 2006/0261240 A1 | 11/2006 | Nault et al. | |

FOREIGN PATENT DOCUMENTS

| | | |
|---|---|---|
| DE | 102 12 285 A1 | 11/2002 |
| EP | 0 315 023 A2 | 5/1989 |
| EP | 0 571 307 A1 | 11/1993 |
| EP | 0 486 442 B1 | 10/1995 |
| EP | 0 874 260 A1 | 10/1998 |
| EP | 1 033 800 A1 | 9/2000 |
| EP | 1 160 949 A2 | 12/2001 |
| EP | 1 160 950 A2 | 12/2001 |
| EP | 1 249 912 A1 | 10/2002 |
| FR | 1479341 | 5/1967 |
| GB | 549840 | 12/1942 |
| GB | 1 342 085 | 12/1973 |
| WO | WO 99/06746 | 2/1999 |
| WO | WO 00/75550 A1 | 12/2000 |
| WO | WO 02/18991 A1 | 3/2002 |
| WO | WO 02/31939 A1 | 4/2002 |
| WO | WO 02/33445 A2 | 4/2002 |
| WO | WO 02/086576 A1 | 10/2002 |
| WO | WO 2004/006400 A1 | 1/2004 |

OTHER PUBLICATIONS

Exhibit A, Ditel, Inc.; Ditel UPL-1000/UPT-1000/Corner Cable Guides; product information, 2 pages (© 1986).

Exhibit B, ADC Telecommunications, Inc.; FiberGuide™, Fiber Management System, 6 pages front and back printed (Jun. 1989).

Exhibit C, Warren & Brown Technologies Pty. Ltd., Fibre Optic Management Systems, Component Selection Guide, 19 pages of product information. Source: www.warrenandbrown.com.au (admitted prior art as of the filing date of the present application).

Exhibit D, Panduit Network Connectivity Group, FiberRunner™ 6×4 Routing System Product Brochure, 2 pages, © Panduit Corp. (2000).

Exhibit E, Panduit Corp. FiberRunner™ 4×4 Quiklock™ Coupler (FRBC4×4) Customer Drawing, 1 page (Jul. 13, 2001).

Exhibit F, Panduit Corp. FiberRunner198 6×4 Quiklock™ Coupler (FRBC6×4) Customer Drawing, 1 page (May 10, 2000).

Exhibit G, Panduit Corp. FiberRunner™ 12×4 Quiklock™ Coupler (FRBC12×4) Customer Drawing, 1 page (Jan. 3, 2001).

Exhibits H-M, Photographs of various Panduit products (admitted prior art as of the filed of the present application).

Exhibit N, ADC Telecommunications, Inc., "FiberGuide® Fiber Management System Application and Installation Manual," pp. i-vi, 1-1-5-36, 4th Edition, Issue 3 (Mar. 1996).

Exhibit O, ADC Telecommunications, Inc., "FiberGuide® System Installation Manual," pp. i-viii, 3-1-4-33, Issue 1 (Sep. 2002).

Exhibit P, ADC Telecommunications, Inc., "FiberGuide® Fiber Management Systems," 6 pages (May 2005).

* cited by examiner

FIG. 4
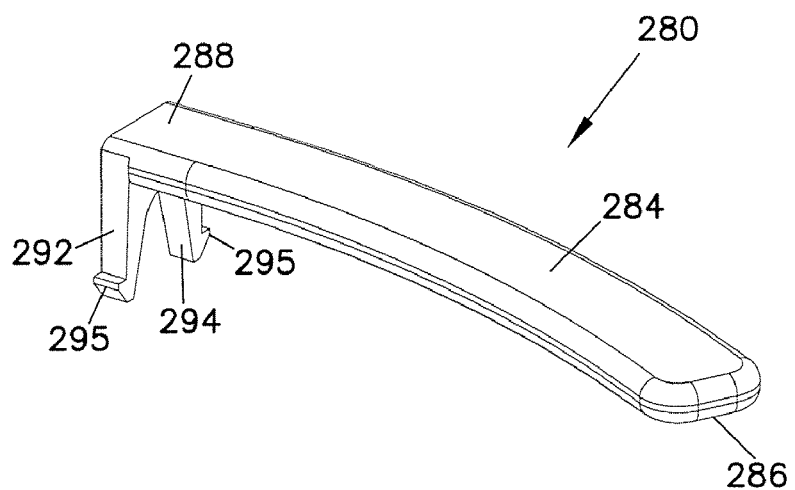
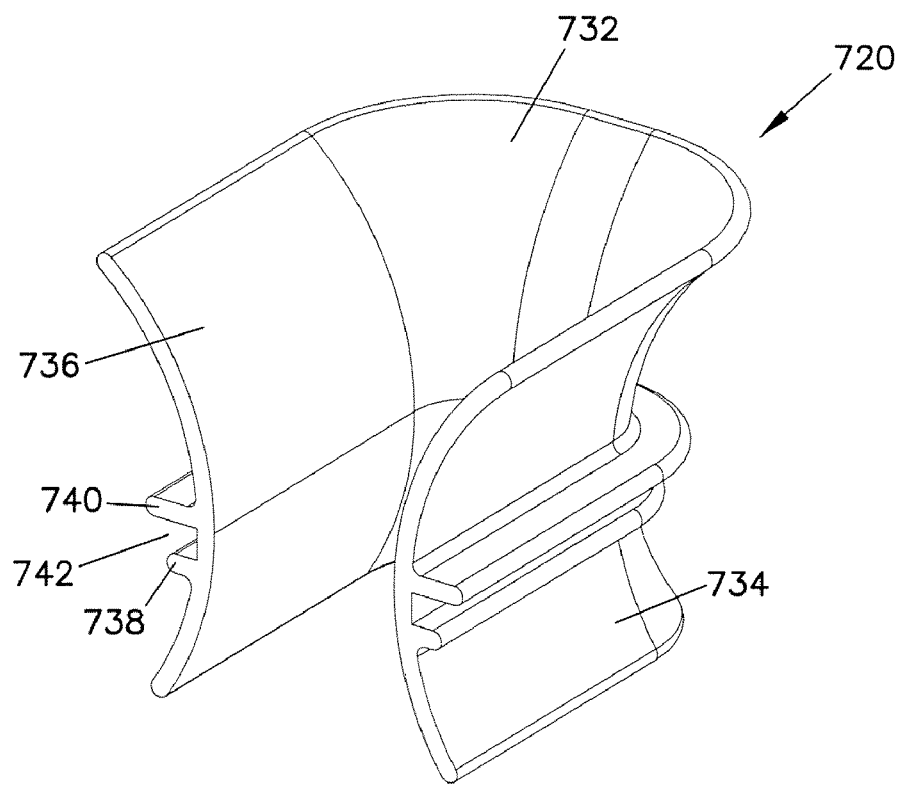
FIG. 14

CABLE ROUTING DEVICES WITH INTEGRATED COUPLERS

BACKGROUND

In the telecommunications industry, optical fiber systems are increasingly used for high-speed signal transmission. With the increased utilization of optical fiber systems, optical fiber cable management requires industry attention.

One area of optical fiber management is the routing of optical fibers from one piece of equipment to another. For example, in a telecommunications facility, optical fiber cables are routed between fiber distribution equipment and optical line terminating equipment. In buildings and other structures that carry such equipment, the cable routing typically takes place in concealed ceiling areas or in other manners to route cables from one location to another.

When routing optical fibers and other cables such as copper wires, it is desirable that a routing system is readily modifiable and adaptable to changes in equipment needs. Accordingly, such routing systems include a plurality of components. For example, longitudinal trough members can be used to carry optical fibers along straight passages. Fittings can be used at intervals to accomplish bends, turns, and changes in elevation. Trumpets can be used to allow cable to enter and exit trough members at proper bend radii. The trough members, fittings, and trumpets are joined together by couplings to form the cable routing system. U.S. Pat. Nos. 5,067,678; 5,316,243; 5,752,781; 6,709,186; and 6,715,719 teach cable routing systems that include a plurality of trough members, fittings, trumpets that are joined by couplers.

Various concerns arise with the use of such systems. One concern is that a plurality of components is used for joining the trough members, fittings, and trumpets. These components increase the number of pieces in the system and can increase the costs associated with and size of the final system.

SUMMARY

Embodiments disclosed herein relate to a system for the management and routing of telecommunication cables.

One aspect relates to a fitting for a cable trough system, the fitting including a bottom wall and side walls extending from at least a first terminal end to a second terminal end and forming a trough therebetween, the side walls being curved in a longitudinal direction, and an end portion formed at each of the first and second terminal ends, the end portion including first and second guiding surfaces defining a space therebetween, and a spring member positioned in the space. The space is sized to receive a terminal end of a trough member of the cable trough system, and wherein the spring member is positioned to engage the terminal end of the trough member to couple the trough member to the fitting.

Another aspect related to a cable trough system including a trough member including a trough bottom wall and two trough side walls extending longitudinally from a first terminal end to a second terminal end, and a fitting including a bottom wall and side walls extending from at least a first terminal end to a second terminal end and forming a trough therebetween, the side walls being curved in a longitudinal direction, and an end portion formed at each of the first and second terminal ends, the end portion including first and second guiding surfaces defining a space therebetween, and a spring member positioned in the space. The space is sized to receive the first terminal end of the trough member, and wherein the spring member is positioned to engage the first terminal end of the trough member to couple the trough member to the fitting.

Another aspect relates to a trumpet member of a cable trough system, the trumpet member including a bottom wall and side walls extending from a first terminal end to a flared second end, and an end portion formed at the first terminal end, the end portion including first and second guiding surfaces defining a space therebetween, and a spring member positioned in the space. The space is sized to receive a trough side wall of a trough member of the cable trough system, and wherein the spring member is positioned to engage the trough side wall of the trough member to couple the trumpet member to the trough member.

Another aspect relates to a fitting for a cable trough system, the fitting including a bottom wall and opposing side walls extending from at least a first terminal end to a second terminal end and forming a trough therebetween, the side walls being curved in a longitudinal direction and defining opposing apertures adjacent the opposing side walls, and a pair of fingers, each finger including a curved main body. Each finger is configured to be snapped into one of the opposing apertures so that free ends of the pair of fingers overlap and form a space therebetween.

Another aspect relates to a finger configured to retain cable in a cable trough system, the finger including a curved main body, a first free end, and a second end including an attachment portion, the attachment portion including first and second legs extending from the second end, the first and second legs including barbs positioned to engage a portion of the cable trough system when the finger is coupled thereto.

Another aspect relates to a method for coupling a fitting to a trough member, the method comprising: positioning a terminal end of a trough member adjacent to an end portion of a fitting, the end portion including first and second guiding surfaces defining a space therebetween, and a spring member positioned in the space; and sliding the terminal end of the trough member into the space so that the spring member engages the terminal end of the trough member to couple the trough member to the fitting.

DESCRIPTION OF THE DRAWINGS

FIG. 4 is a perspective view of an example finger of the fitting of FIG. 2.

FIG. 14 is a perspective view of an example exit flare of the slotted trough member of FIG. 13.

DETAILED DESCRIPTION

As used herein, the terms "couple" and "coupled" mean to join or attach a first element in relation to a second element, whether the attachment is made directly with the second element or indirectly through one or more intermediate components.

Figure 1:
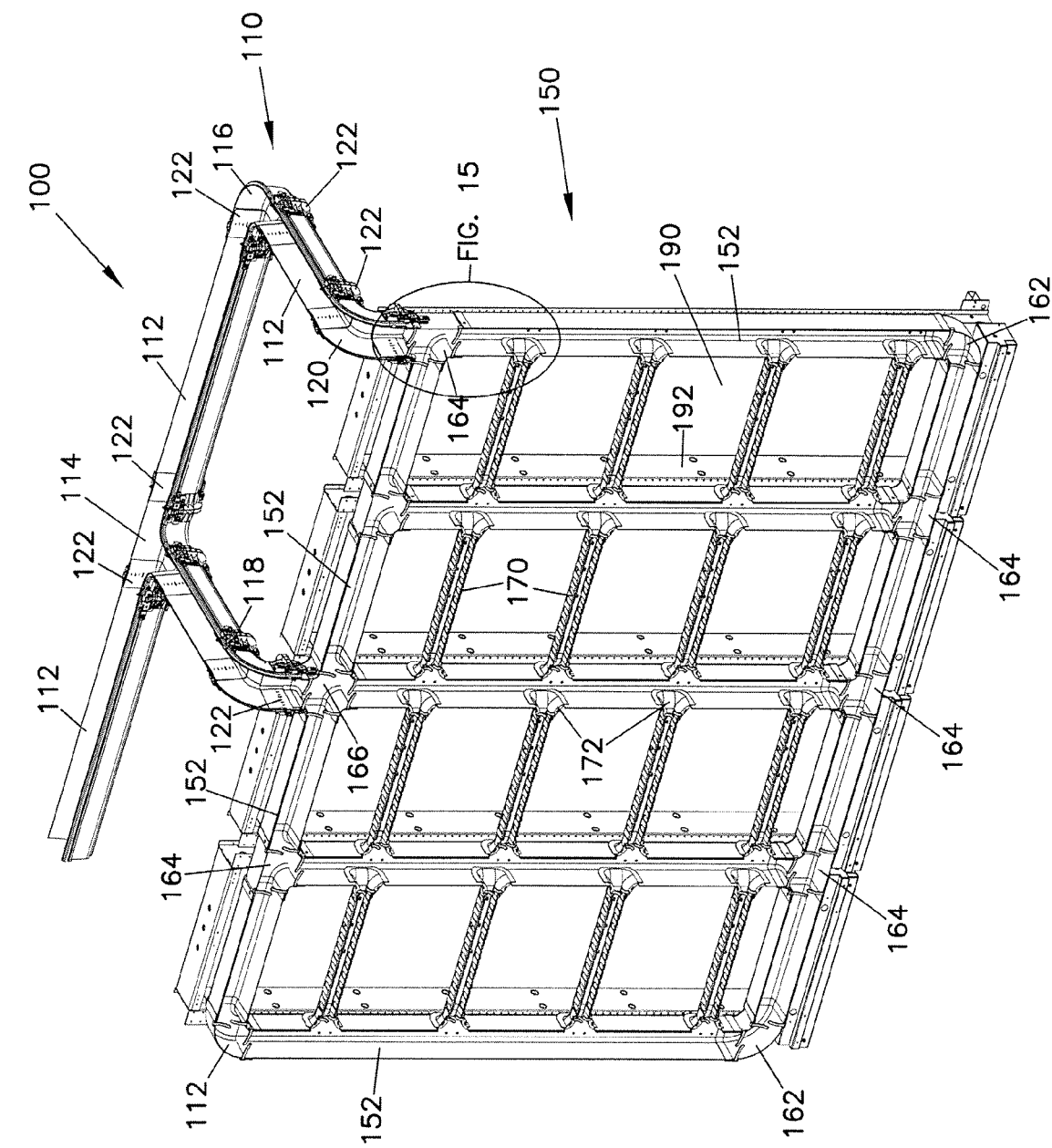
FIG. 1 is a perspective view of an example cable trough system.

FIG. 1 shows an example cable trough system 100 (sometimes referred to as a "raceway"). Trough system 100 generally includes a horizontal trough portion 110 and a vertical trough portion 150. In example embodiments, horizontal trough portion 110 is positioned adjacent to or within a ceiling of a structure, and vertical trough portion 150 is coupled to and extends downwardly from horizontal trough portion 110, as described further below.

Horizontal trough portion 110 includes a plurality of longitudinal trough members 112 (sometimes referred to as "straight sections") that are coupled to respective fittings 114, 116, 118, 120 by couplers 122 (sometimes referred to as "junctions"). In example embodiments, couplers 122 are configured as one or more of the couplers disclosed in U.S. Pat. Nos. 5,067,678; 5,316,243; 5,752,781; 6,709,186; and 6,715,719, the entireties of which are hereby incorporated by reference. Generally, each coupler 122 includes one or more locking elements that couple one trough member 112 to another trough member 112 or to fittings 114, 116, 118, 120. Horizontal trough portion 110 is configured to allow cables to be routed therethrough from and to vertical trough portion 150.

In example embodiments, horizontal trough portion 110 is coupled to vertical trough portion 150 by fittings 118, 120, as described further below. Vertical trough portion 150 includes a plurality of longitudinal trough members 152 coupled to each other by fittings 162, 164, 166. A plurality of slotted trough members 170 are coupled to adjacent trough members 152 by trumpet members 172.

As used herein, the term "fitting" means a component of a trough system that is curved in a longitudinal direction to allow for changes in elevation (e.g., dips) and/or changes in direction (e.g., bends and turns). Examples of such fittings include, without limitation: up and down elbows (e.g., 45 and 90 degrees); elbows (e.g., 45 and 90 degrees); tees; and crosses. In example embodiments, fittings 114, 116, 118, 120, 162, 164, 166 present a cross-section similar to that of trough members 112, 152, respectively, such that each of the fittings defines a cable pathway which, when connected to the trough members, provides for a continuous cable pathway which includes bends, dips and turns.

Horizontal and vertical trough portions 110, 150 of trough system 100 form an integrated raceway system through which cable is routed.

A plurality of openings 190 are formed between adjacent trough members 152, 170. In example embodiments, vertical trough portion 150 is mounted to a rack 192 and includes a plurality of cable routing devices. Fiber optic equipment (not shown), such as fiber distribution equipment and optical line terminating equipment, is also mounted to rack 192 such that the fiber optic equipment is accessible through openings 190. Cable is routed to and from the fiber optic equipment through vertical trough portion 150 and horizontal trough portion 110.

Figure 2:
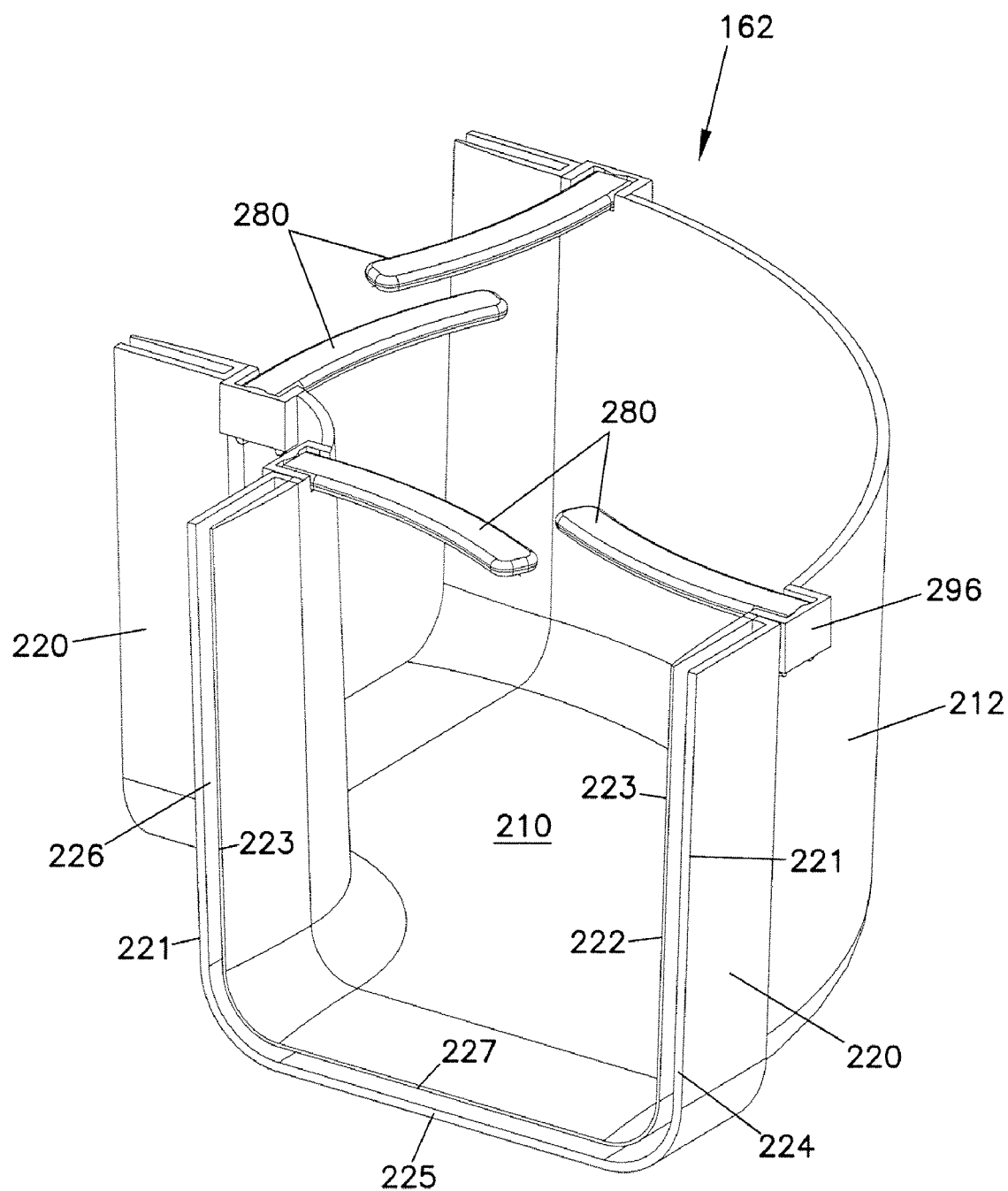
FIG. 2 is a perspective view of an example fitting of the cable trough system of FIG. 1.
Figure 3:
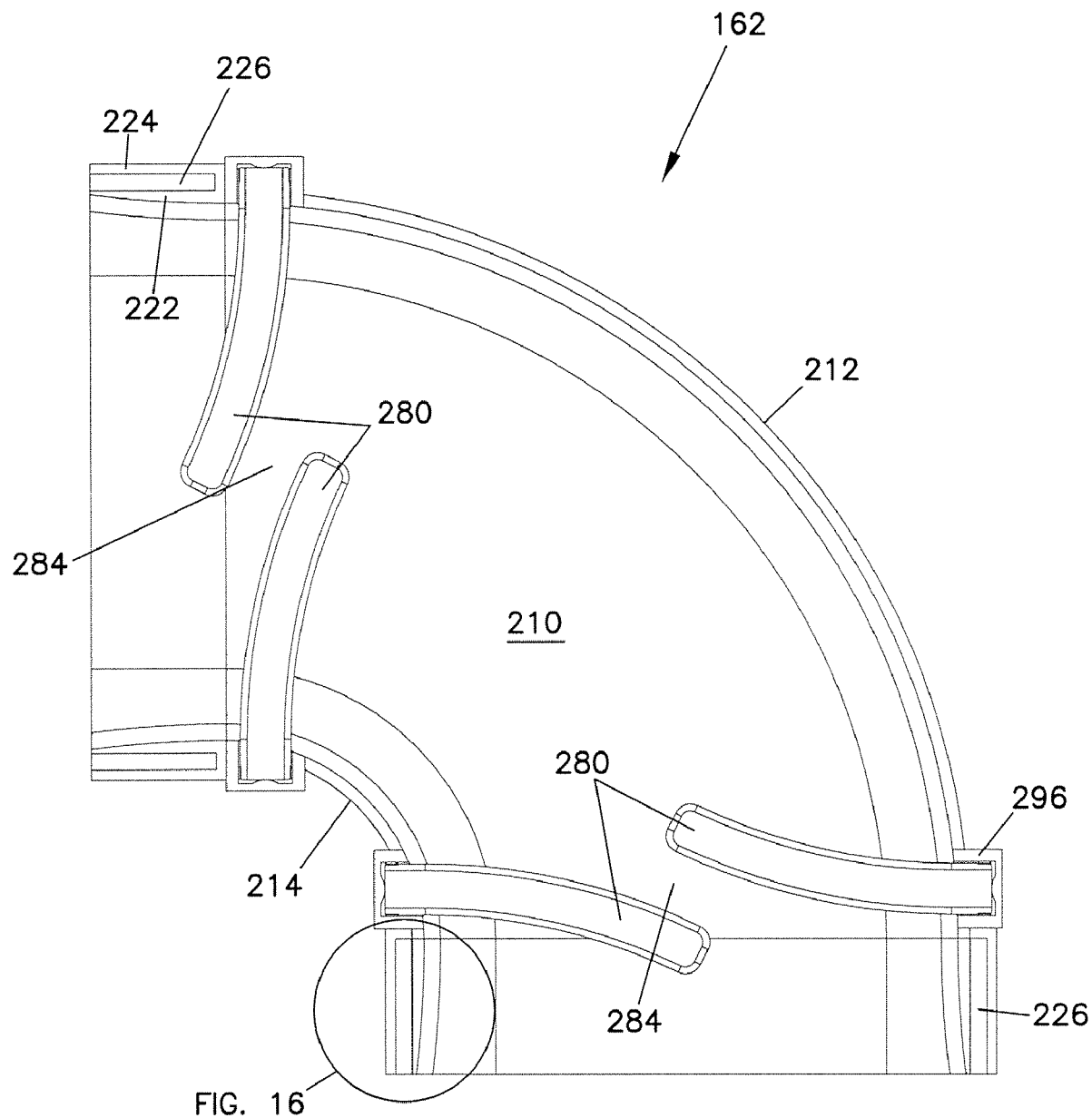
FIG. 3 is a top view of the fitting of FIG. 2.

Referring now to FIGS. 2 and 3, example fitting 162 is shown. Fitting 162 includes a bottom wall 210 and side walls 212, 214 that generally form a U-shaped trough. Bottom and side walls 210, 212, 214 of fitting 162 are curved in a longitudinal direction to form a 90 degree bend or elbow through which cable is routed.

Each end of fitting 162 includes a coupling portion 220. In example embodiments, each coupling portion 220 is formed as an integrated part of fitting 162 such that fitting 162 including and coupling portions 220 are of a one-piece construction.

Coupling portion 220 includes bottom and side walls 227, 223 that form a first U-shaped guiding surface 222, and bottom and side walls 225, 221 that form a second U-shaped guiding surface 224. A spacing 226 is formed between first and second guiding surfaces 222, 224. As described further below, spacing 226 is sized to receive an end of a trough member, such as trough members 152. In example embodiments, spacing 226 is sized to receive trough members of 2 inches, 4 inches, 6 inches, or 12 inches in size. Other sizes can be used.

Figure 16:
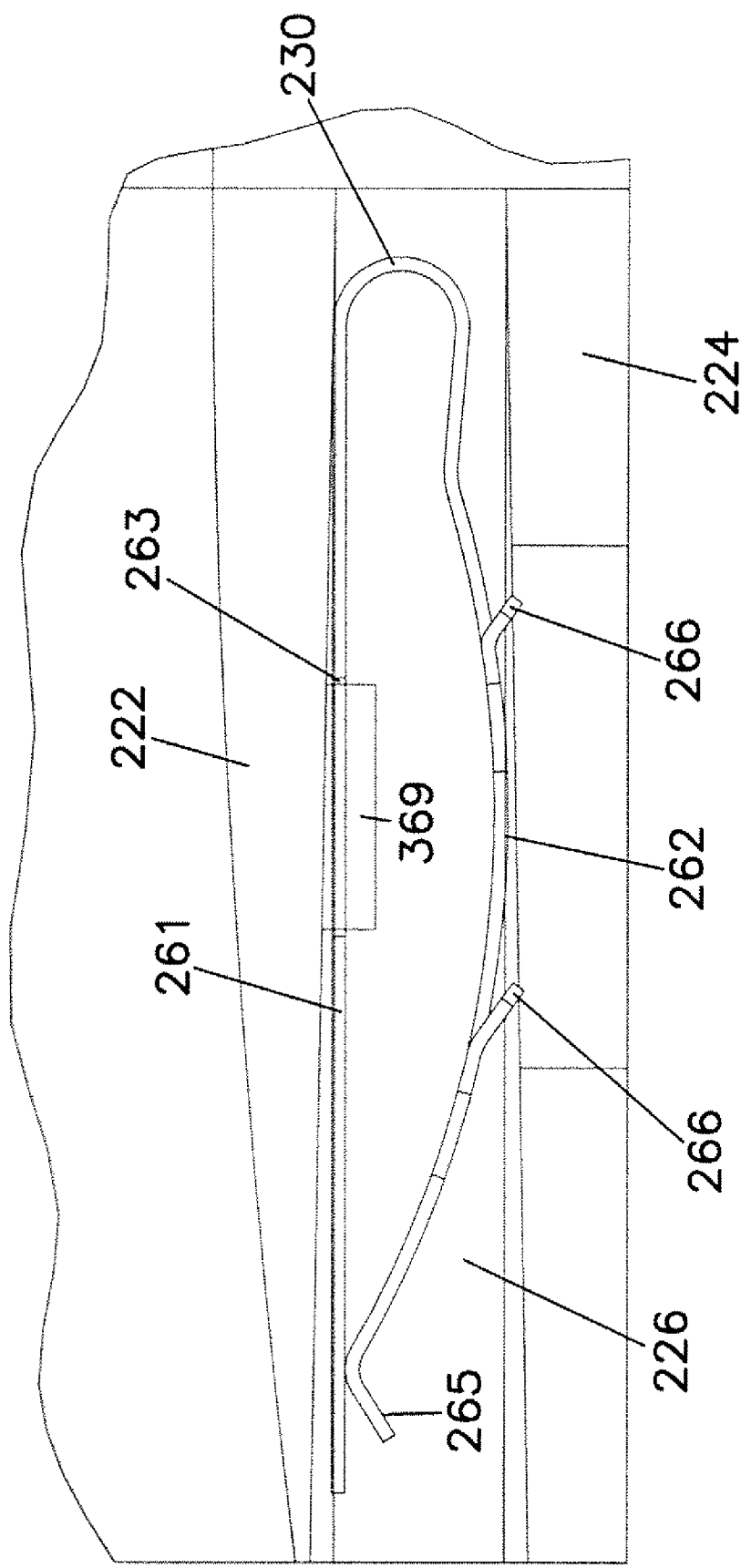
FIG. 16 is a top view of a section of a coupling portion of the fitting of FIG. 2.
Figure 17:
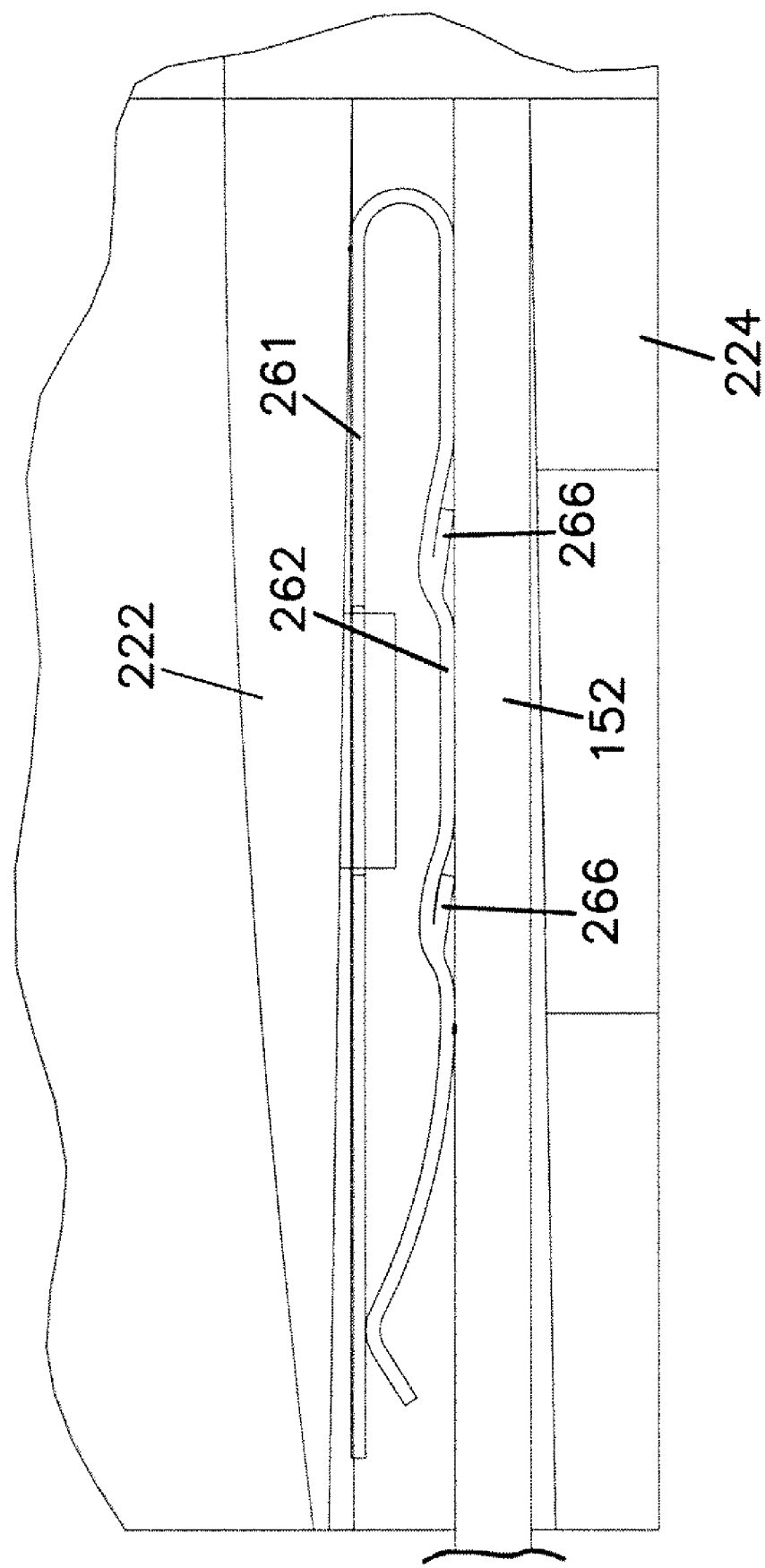
FIG. 17 is another top view of the section of the coupling portion of FIG. 16 with a terminal end of a trough member inserted therein.

Referring now to FIGS. 16 and 17, in example embodiments, one or more spring members 230 are positioned within spacing 226. For example, in one embodiment, two spring members 230 are positioned on opposite sides between side walls 221, 223, and another spring member 230 is positioned between bottom walls 225, 227. In other configurations, more or fewer spring members 230 can be used. For example, in an alternative embodiment, four spring members 230 are included between first and second guiding surfaces 222, 224.

In the example shown, each spring member 230 is a leaf spring including a base 261 and a main body 262. In example embodiments, base 261 includes an aperture 267 formed therein to engage a projection 369 formed within spacing 226 to retain spring member 230 within spacing 226.

Main body 262 of spring member 230 is bowed such that main body 262 extends towards second guiding surface 224. Spring member 230 has a terminal end 265 that is bent back to permit a leading end of trough members 152 to be inserted within spacing 226. Upon sliding of the leading end of a trough member 152 into spacing 226, the leading end of trough member 152 forces main body 262 of spring member 230 away from first guiding surface 222 as shown in FIG. 17.

In example embodiments, each spring member 230 is metallic and includes cutout tabs 266 that project toward second guiding surface 224 and are angled into the direction of spacing 226. Tabs 266 act as knife edges, which cut into the plastic of trough members 152 to bite into the walls trough members 152 and resist the withdrawal of the walls of the trough members 152 out of spacing 226 of fitting 162. As a result, the clamping force not only includes the spring bias to hold trough members 152 within fitting 162, but also includes the knife action of tabs 266 biting into the material of trough members 152 to retain the trough members within fitting 162.

Referring now to FIGS. 2, 3, and 4, fitting 162 also includes a plurality of fingers 280 coupled to opposing portions 296 formed by fitting 162. In example embodiments, each finger 280 includes a curved main body 284 with a free end 286 and an attachment end 288.

Figure 20:
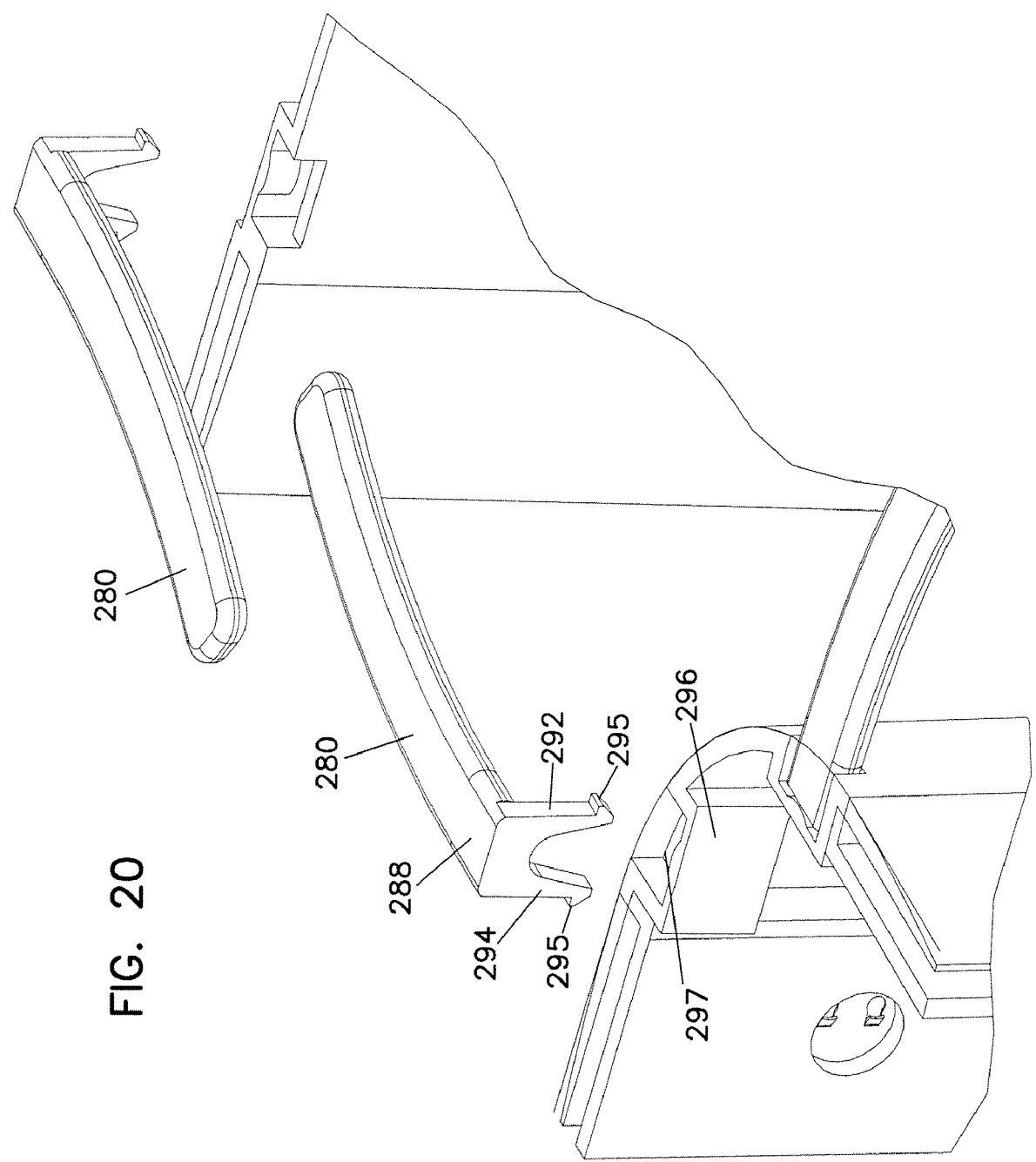
FIG. 20 is a perspective view of a portion of an example fitting including fingers in exploded form.
Figure 21:
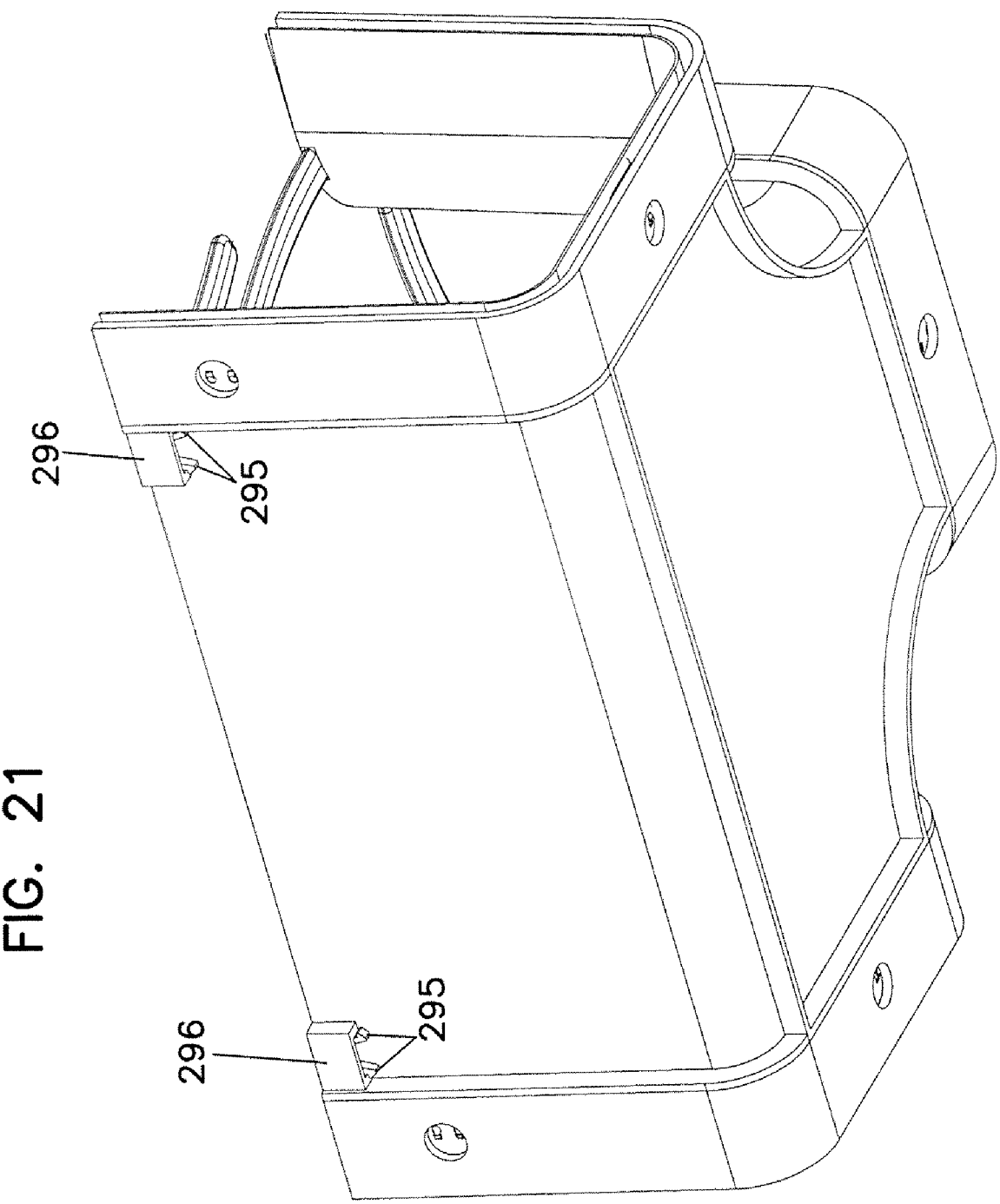
FIG. 21 is another perspective view of the fitting of FIG. 20.

Leg members 292, 294 with barbs 295 are coupled to attachment end 288 to allow finger 280 to be positioned within an aperture 297 formed by portion 296 of fitting 162. See FIGS. 20 and 21. Leg members 292, 294 extend through aperture 297 and barbs 295 engage a lower surface of portion 296 to couple finger 280 to fitting 162. Finger 280 can be removed from portion 296 by pushing leg members 292, 294 towards one another until barbs 295 clear portion 296, thereby allowing leg members 292, 294 to be removed from aperture 297.

As shown in FIGS. 2 and 3, opposing fingers 280 are coupled to each end of fitting 162. Fingers 280 retain cables within fitting 162. In the example shown, opposing fingers 280 are identical in structure, but curve in opposite directions when mounted to fitting 162 because each finger 280 is mounted on an opposing portion 296 of fitting 162. In example embodiments, each opposing portion 296 is located directly across from the other opposing portion 296.

Main body 284 of fingers 280 can vary in length depending on the size (e.g., width) of fitting 162. In example embodiments, main body 284 is long enough so that opposite fingers 280 overlap to form space 284. Other configurations are possible. Since fingers 280 curve in opposite directions, a space 284 is formed between free ends 286 of fingers 280. The overlap of opposite fingers 280 and relatively small size of space 284 function to keep cable within fitting 162, while allowing cable to be added and removed without removing fingers 280 from fitting 162.

Figure 5:
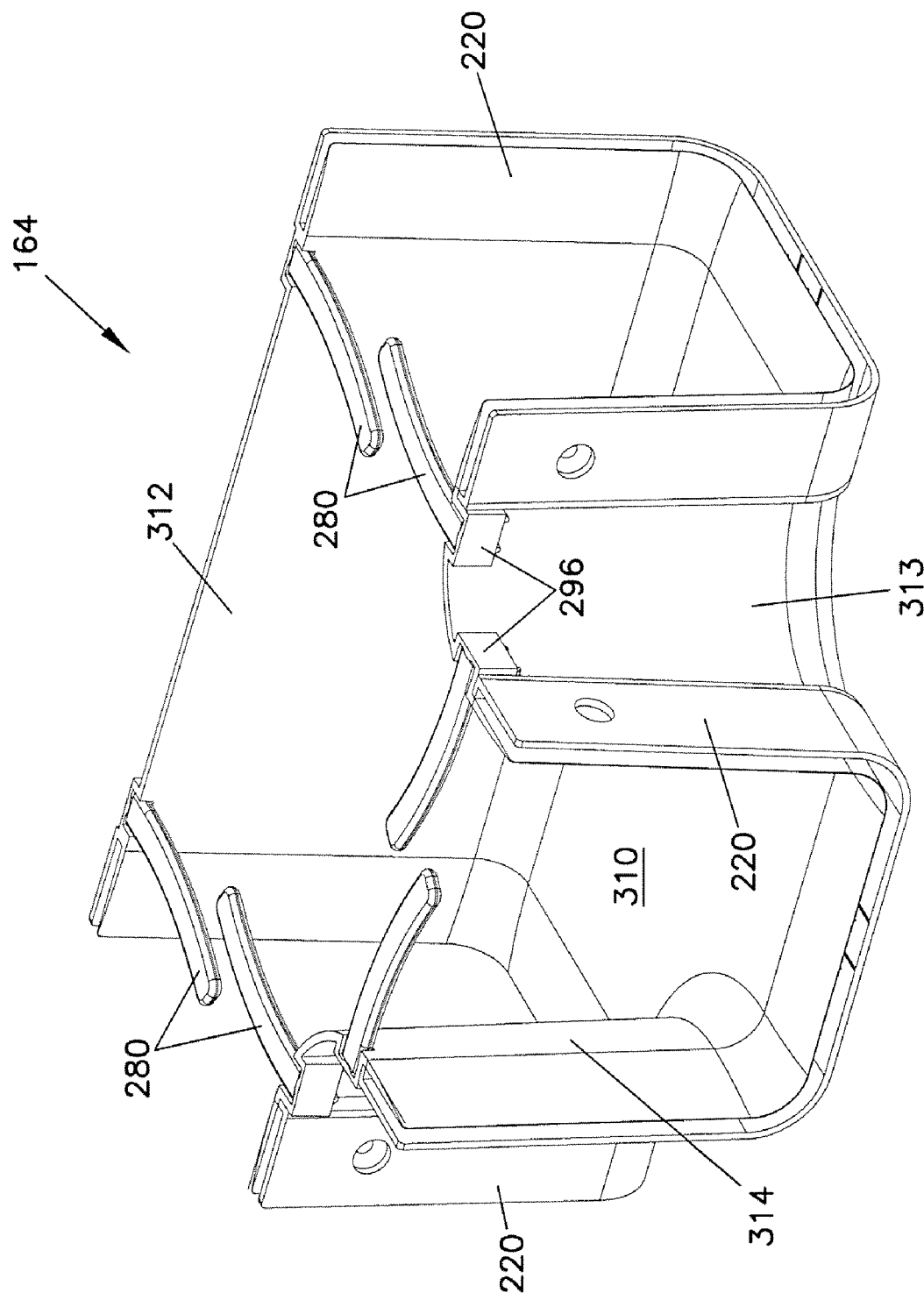
FIG. 5 is a perspective view of another example fitting of the cable trough system of FIG. 1.
Figure 6:
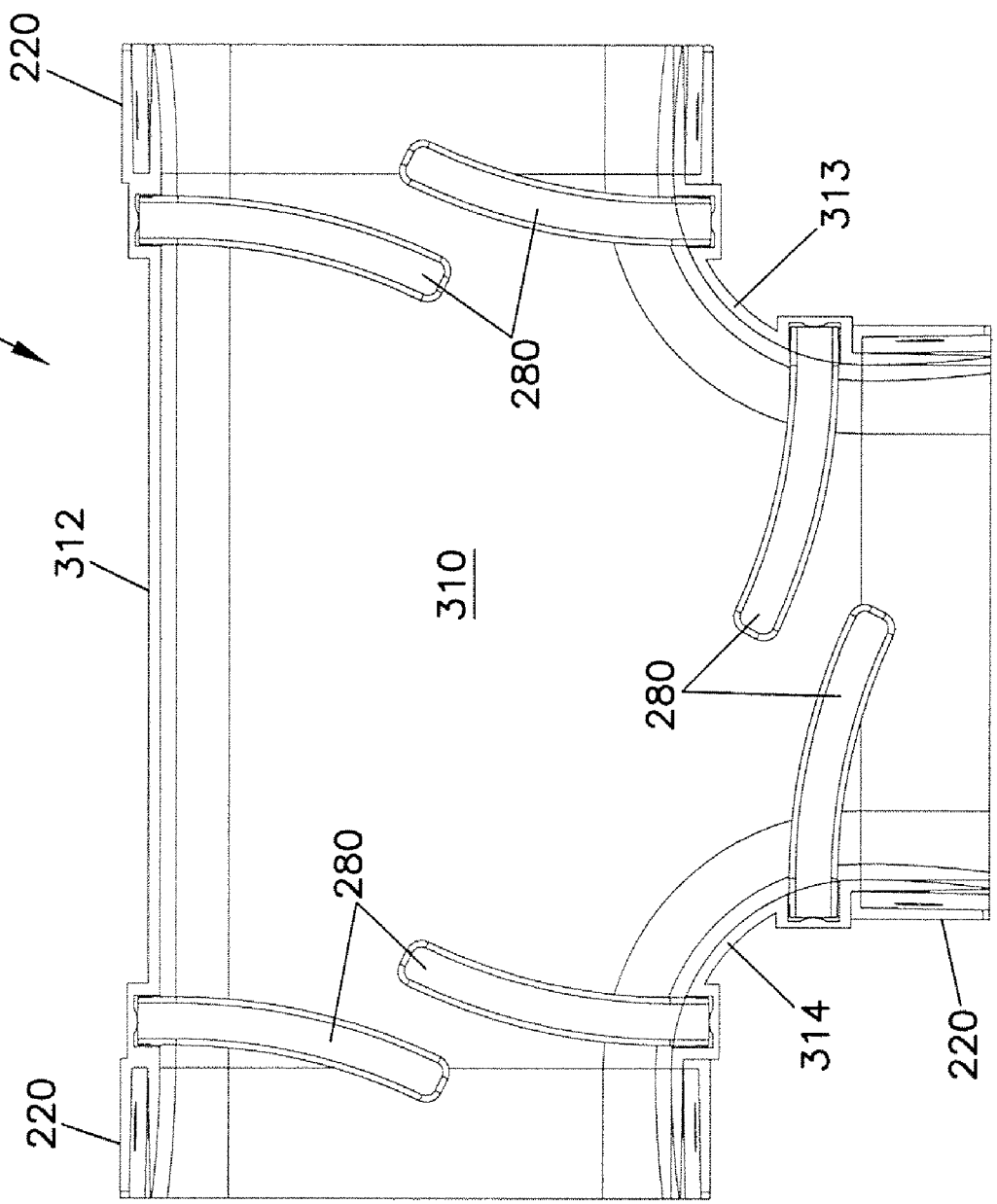
FIG. 6 is a top view of the fitting of FIG. 5.

Referring now to FIGS. 5 and 6, example fitting 164 is shown. Fitting 164 includes a bottom wall 310 and side walls 312, 313, 314 that generally form a U-shaped trough. Bottom and side walls 310, 312, 313, 314 of fitting 164 form a tee through which cable is routed. Each end of fitting 164 includes coupling portion 220 with spring members 230 positioned therein to couple fitting 164 to trough members 152 in a similar manner to that described above with respect to fitting 162. For example, fitting 164 can be coupled to three trough members. A plurality of fingers 280 are coupled to portions 296 of fitting 164.

Figure 7:
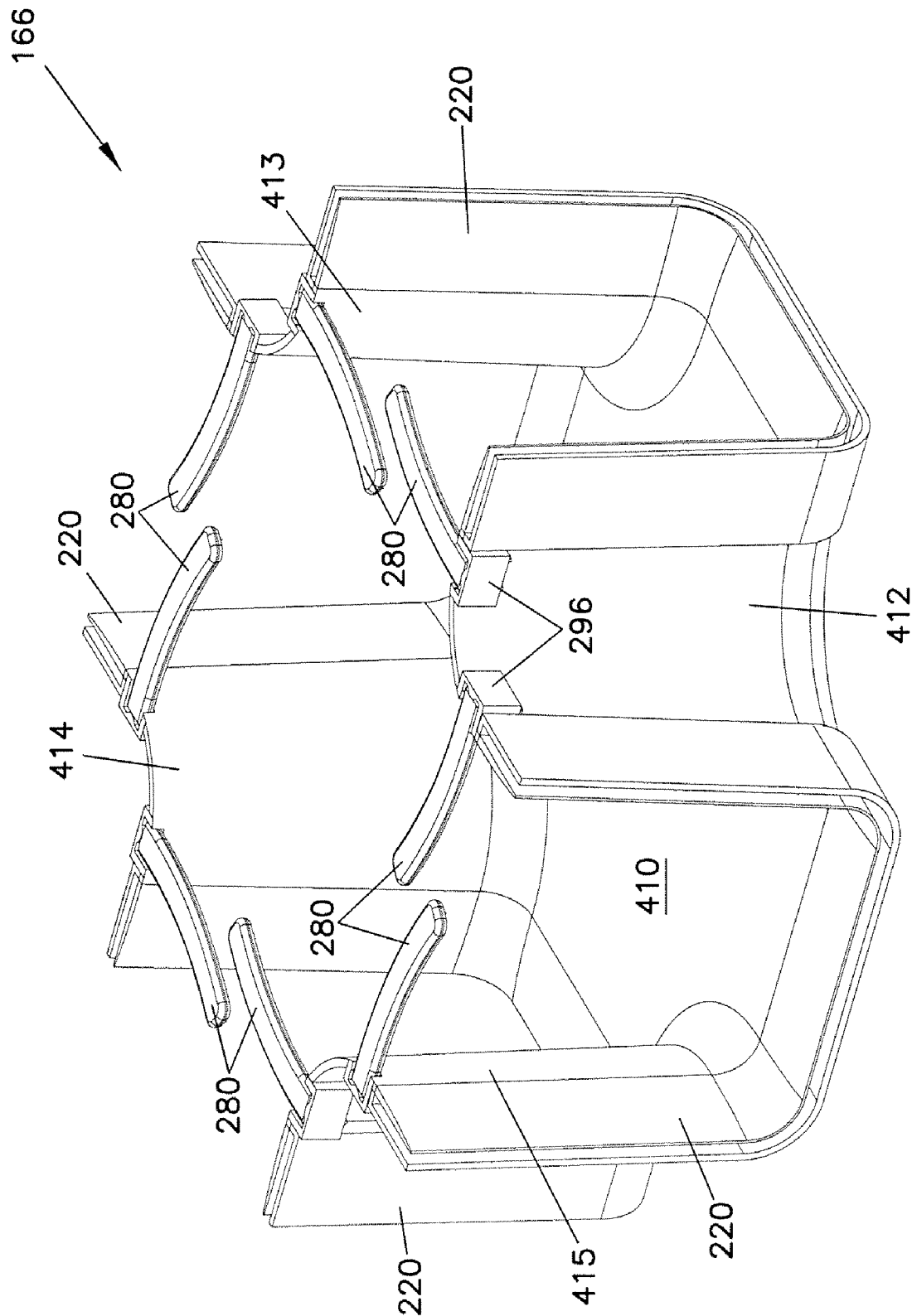
FIG. 7 is a perspective view of another example fitting of the cable trough system of FIG. 1.
Figure 8:
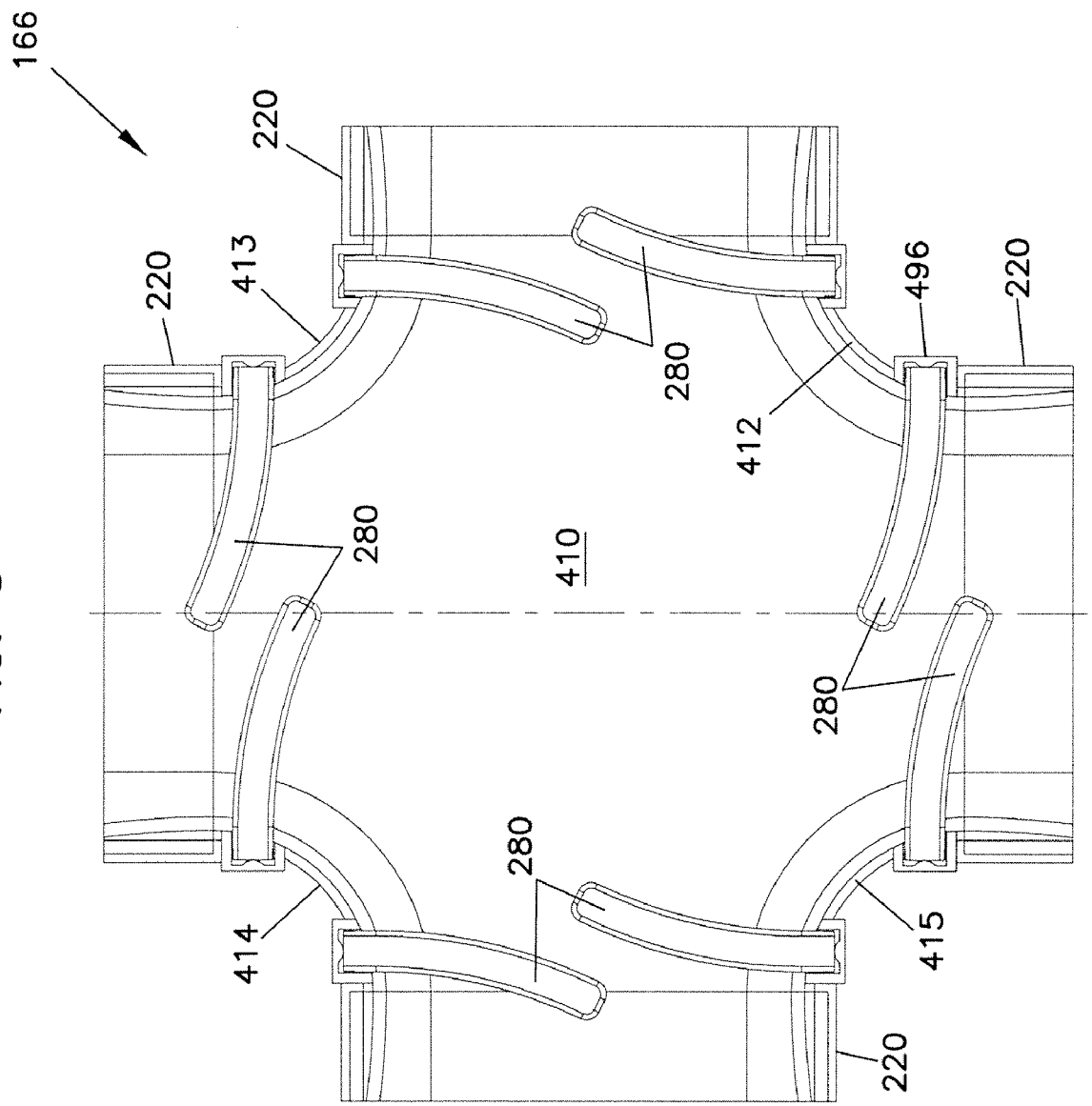
FIG. 8 is a top view of the fitting of FIG. 7.
Figure 9:
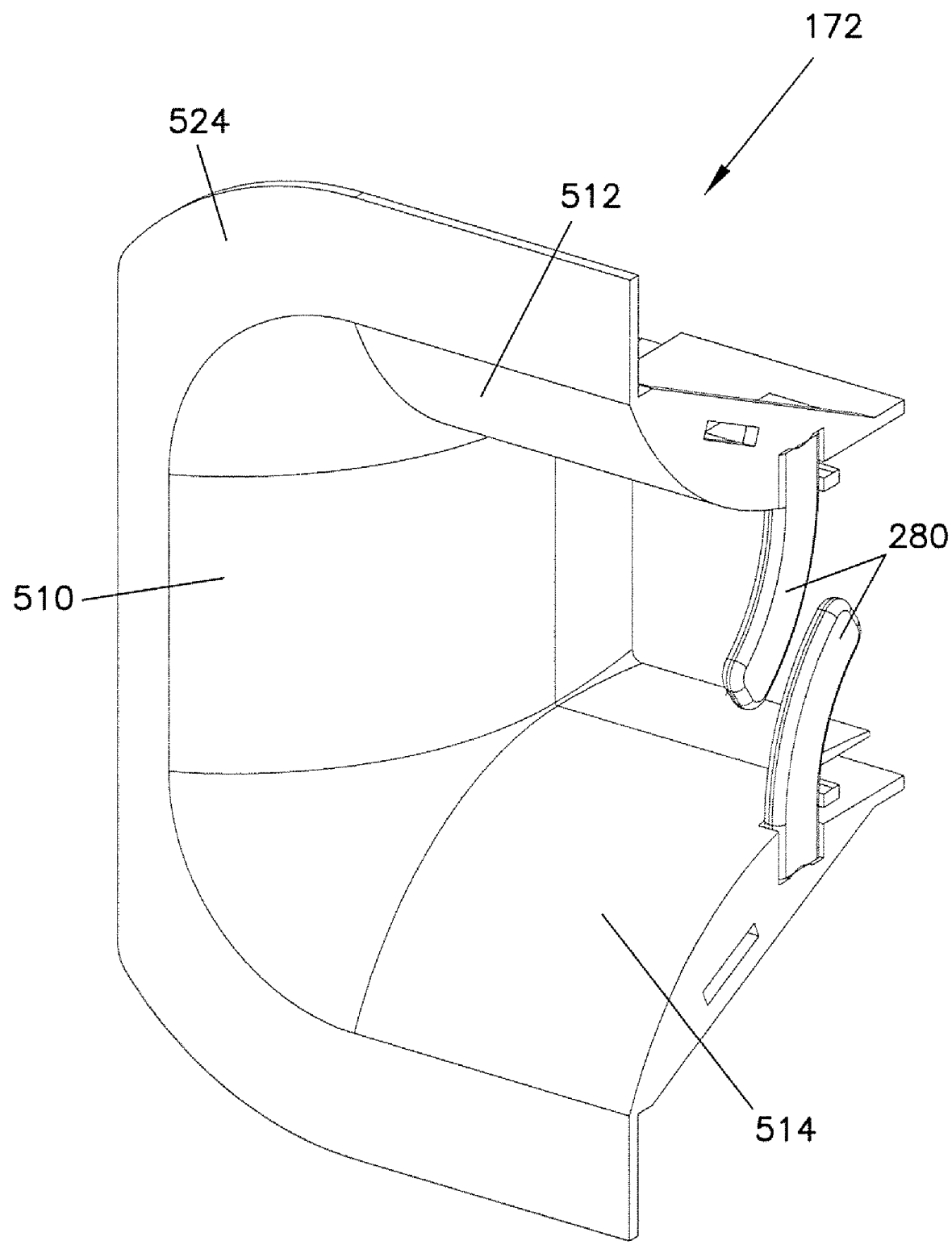
FIG. 9 is a front perspective view of an example trumpet member of the cable trough system of FIG. 1.
Figure 10:
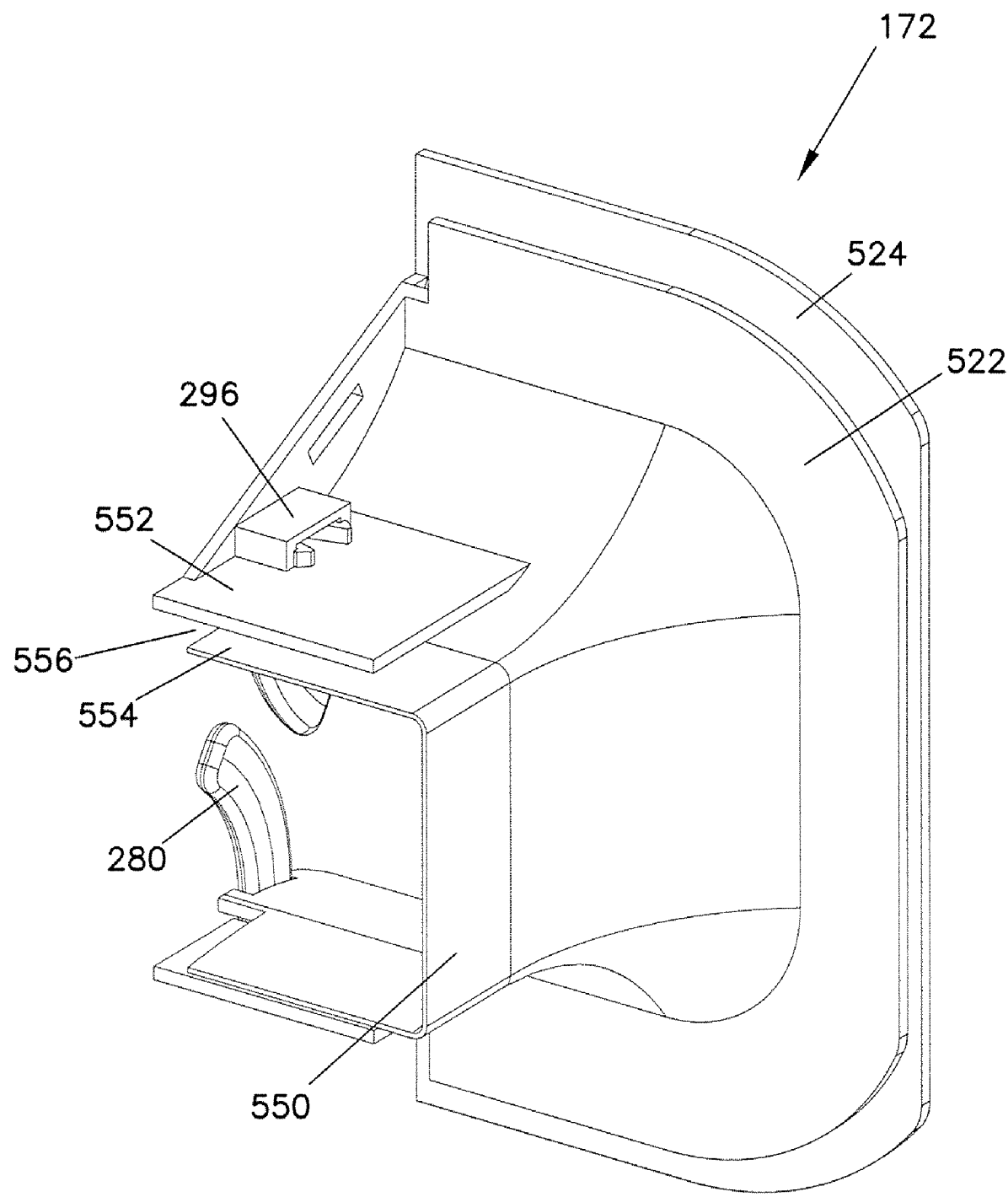
FIG. 10 is a back perspective view of the trumpet member of FIG. 9.
Figure 11:
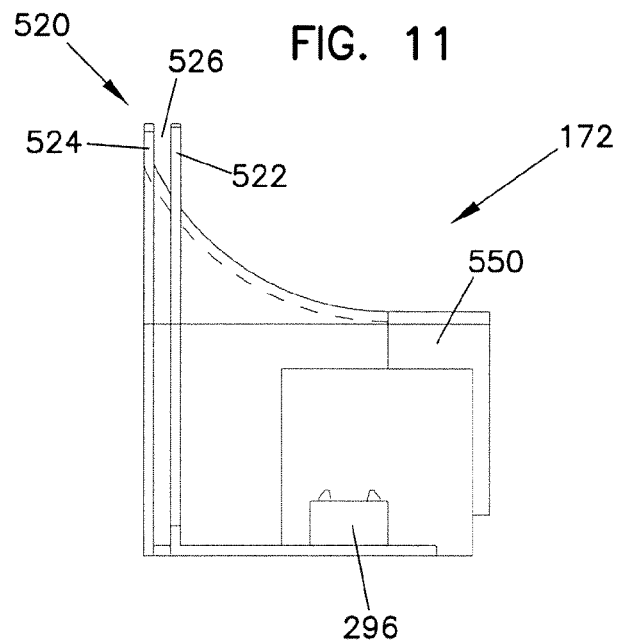
FIG. 11 is a side view of the trumpet member of FIG. 9.
Figure 12:
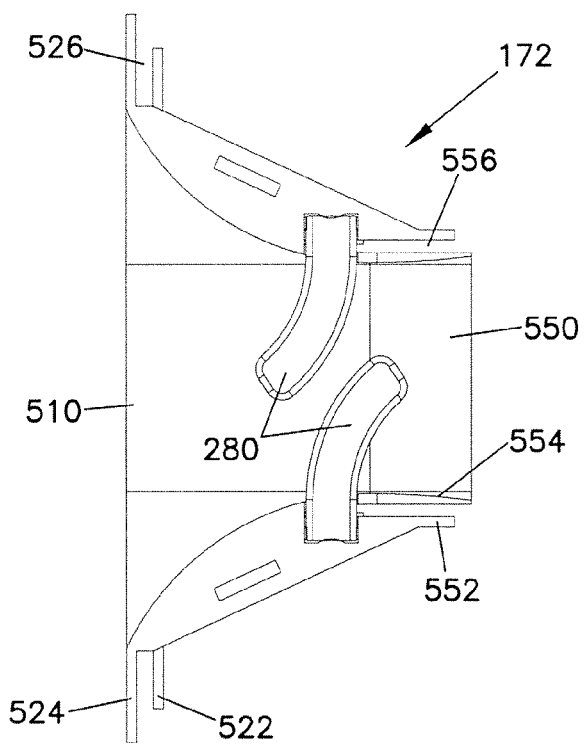
FIG. 12 is a top view of the trumpet member of FIG. 9.

Referring now to FIGS. 7 and 8, example fitting 166 is shown. Fitting 166 includes a bottom wall 410 and side walls 412, 413, 414, 415 that generally form a U-shaped trough. Bottom and side walls 410, 412, 413, 414, 415 of fitting 166 form a cross through which cable can be routed. Each end of fitting 166 includes coupling portion 220 with spring members 230 positioned therein to couple fitting 166 to trough members 152 in a similar manner to that described above with respect to fitting 162. For example, fitting 166 can be coupled to four trough members. A plurality of fingers 280 are coupled to portions 296 of fitting 166.

Referring now to FIGS. 9-13, example trumpet member 172 is shown. Trumpet member 172 includes a bottom wall 510 and side walls 512, 514 that generally form the shape of a flared trumpet. A coupling portion 520 of trumpet member 172 includes first and second surfaces 522, 524 that form a space 526 therebetween. Spring members 230 are positioned therein to couple trumpet member 172 to trough members 152 by inserting coupling portion 520 of trumpet member 172 into an aperture 155 (see FIGS. 15 and 18) formed in one of side walls 605, 606 of trough member 152. A plurality of fingers 280 are coupled to portions 596 of trumpet member 172.

A second coupling portion 550 of trumpet member 172 includes first and second surfaces 552, 554 that form a space 556 therebetween. Spring members 230 are positioned therein to couple trumpet member 172 to a slotted trough member 170 in a similar manner to that described above with respect to fitting 162.

Figure 18:
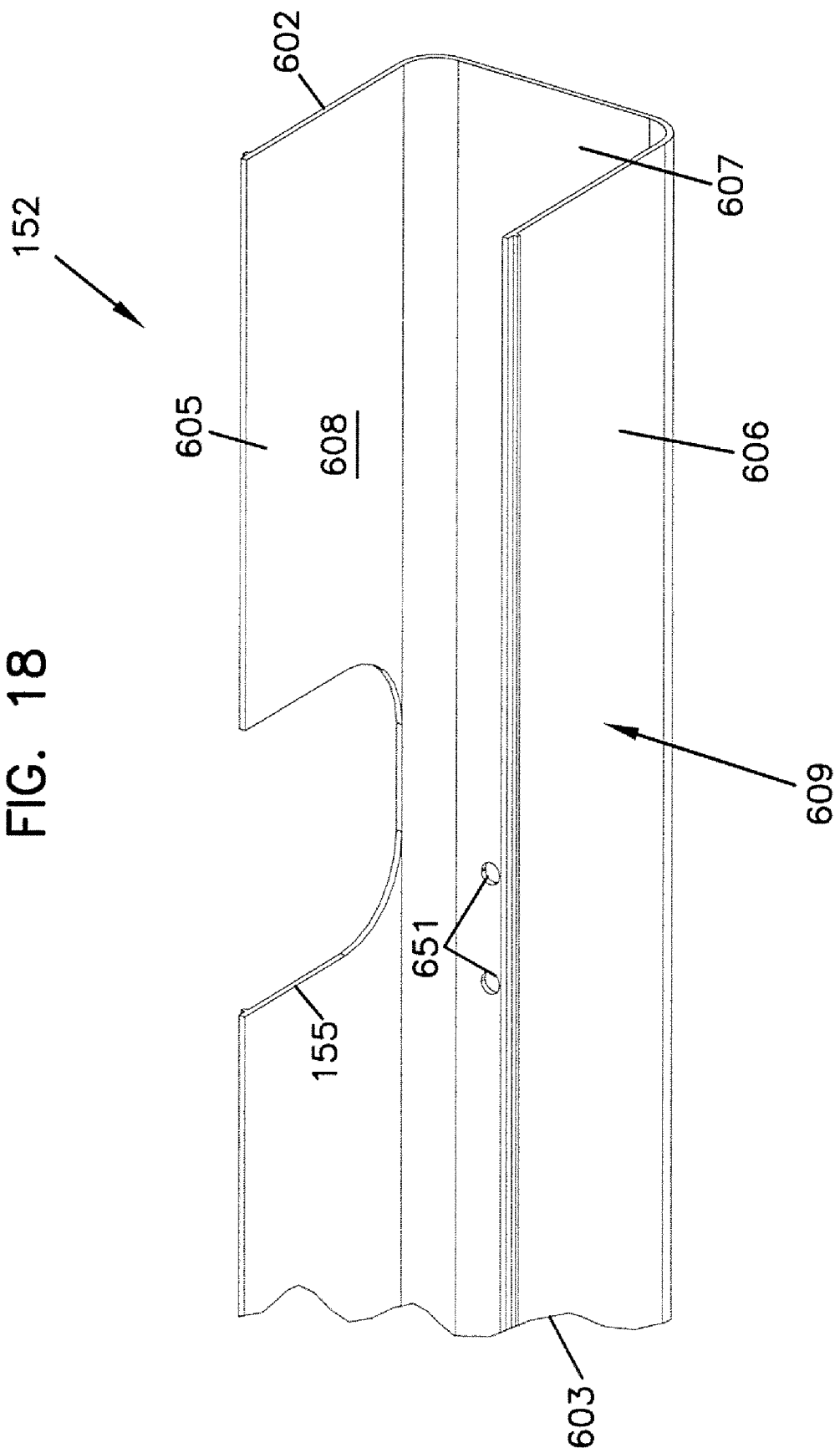
FIG. 18 is a perspective view of a section of a trough member of the trough system of FIG. 1.

Referring now to FIG. 18, trough member 152 is shown. As used herein, the phrase "trough member" is used to refer to any trough, railway, raceway, or similarly configured component including any number of ends. Although a specific embodiment of a trough member is shown in and described herein, other trough members can also be used.

Trough member 152 includes a first terminal end 602 and a second terminal end 603. Trough member 152 is generally in the shape of a U-shaped trough including first and second side walls 605, 606 coupled by a bottom wall 607, thereby defining an interior surface 608 and an exterior surface 609. Walls 605, 606, 607 are each generally planar to form a straight section through which cable is run.

In example embodiments, one or more apertures 155 can be formed in side walls 605, 606 to receive, for example, trumpet members 172. In addition, apertures 651 are formed in bottom wall 607. Fasteners (not shown) can be extended through apertures 651 to couple trough member 152 to rack 192. See FIG. 1.

Figure 13:
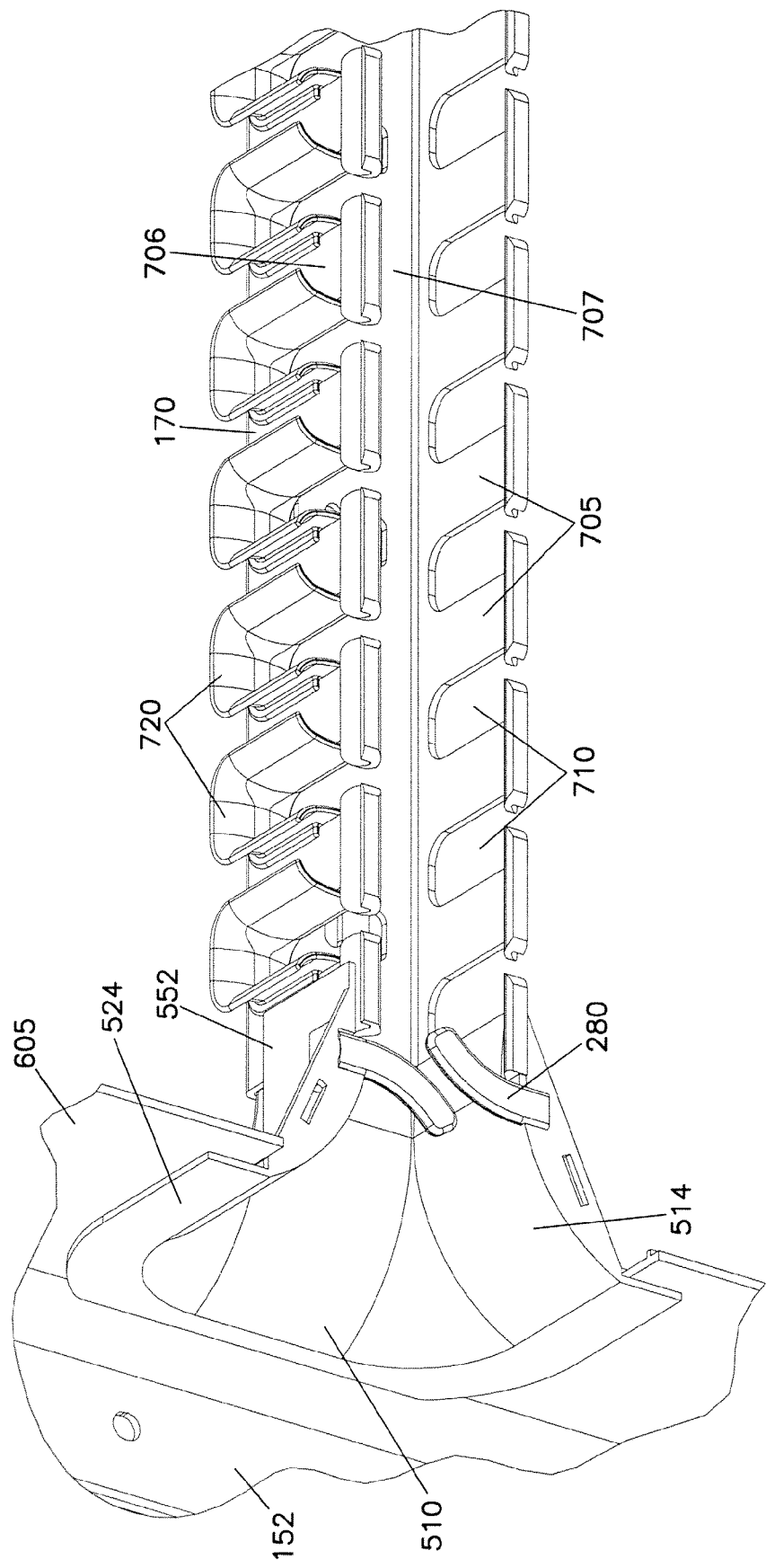
FIG. 13 is a perspective view of the trumpet member and a slotted trough member of the trough system of FIG. 1.
Figure 19:
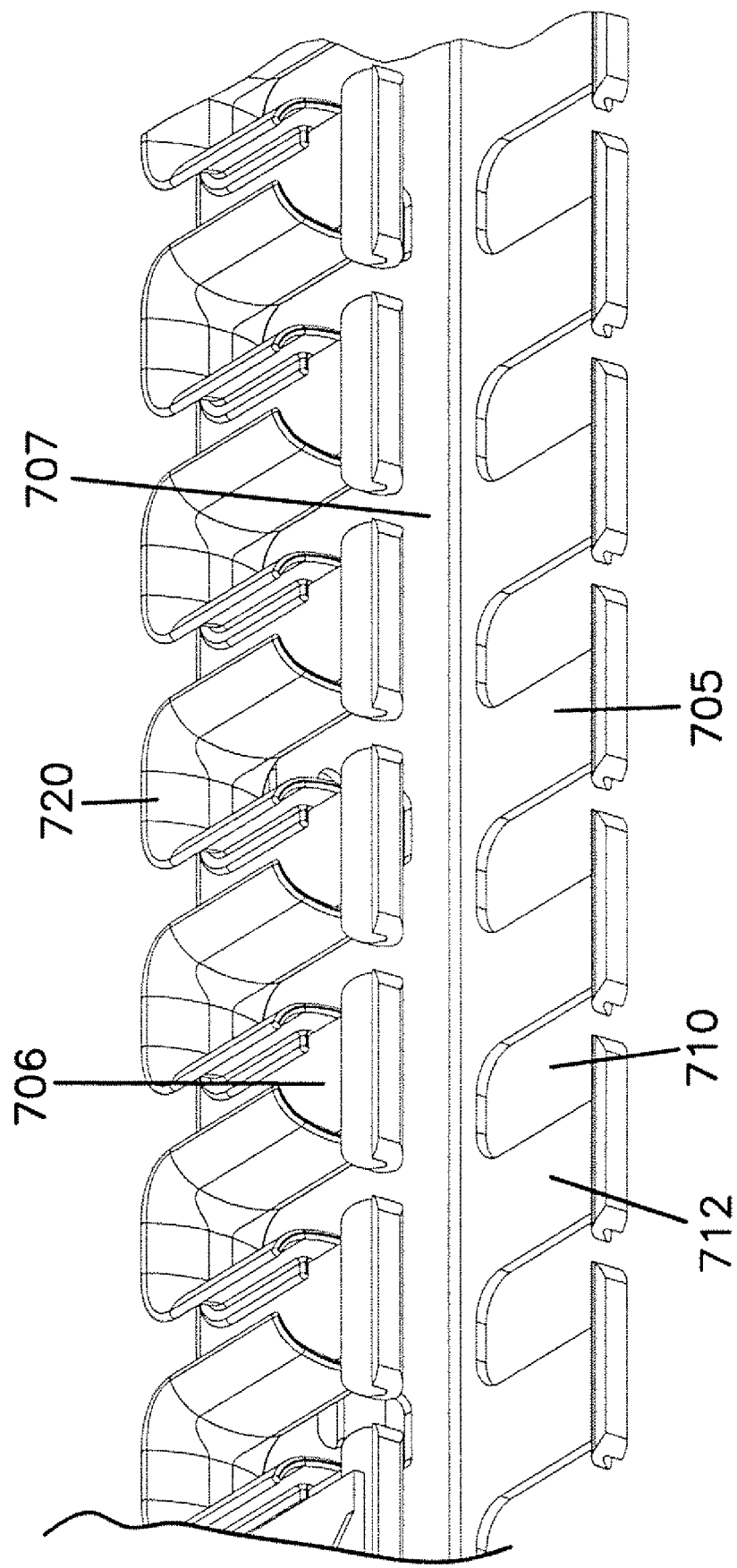
FIG. 19 is a perspective view of a section of a slotted trough member of the trough system of FIG. 1.

Referring now to FIGS. 13, 14, and 19, slotted trough member 170 is shown. Slotted trough member 170 is generally in the shape of a U-shaped trough including first and second side walls 705, 706 coupled by a bottom wall 707. Walls 705, 706, 707 are each generally planar. A plurality of slots 710 are formed in side walls 705, 706 to allow cable to enter and exit therefrom.

Example exit flares 720 can be positioned within slots 710 to provide edge protection for cable entering and exiting slotted trough member 170 through slots 710. Exit flares 720 include a bottom wall 732 and side walls 734, 736 that generally form a flared trough configuration. First and second projections 738, 740 form a groove 742 therebetween. Adjacent walls portions 712 of slotted trough member 170 between slots 710 in sidewalls 705, 706 are received in groove 742 to couple exit flare 720 to slotted trough member 170. In example embodiments, portions 712 are flexible so that adjacent portions 712 can be bowed slightly away from one another to allow exit flare 720 to be positioned within slot 710.

Figure 15:
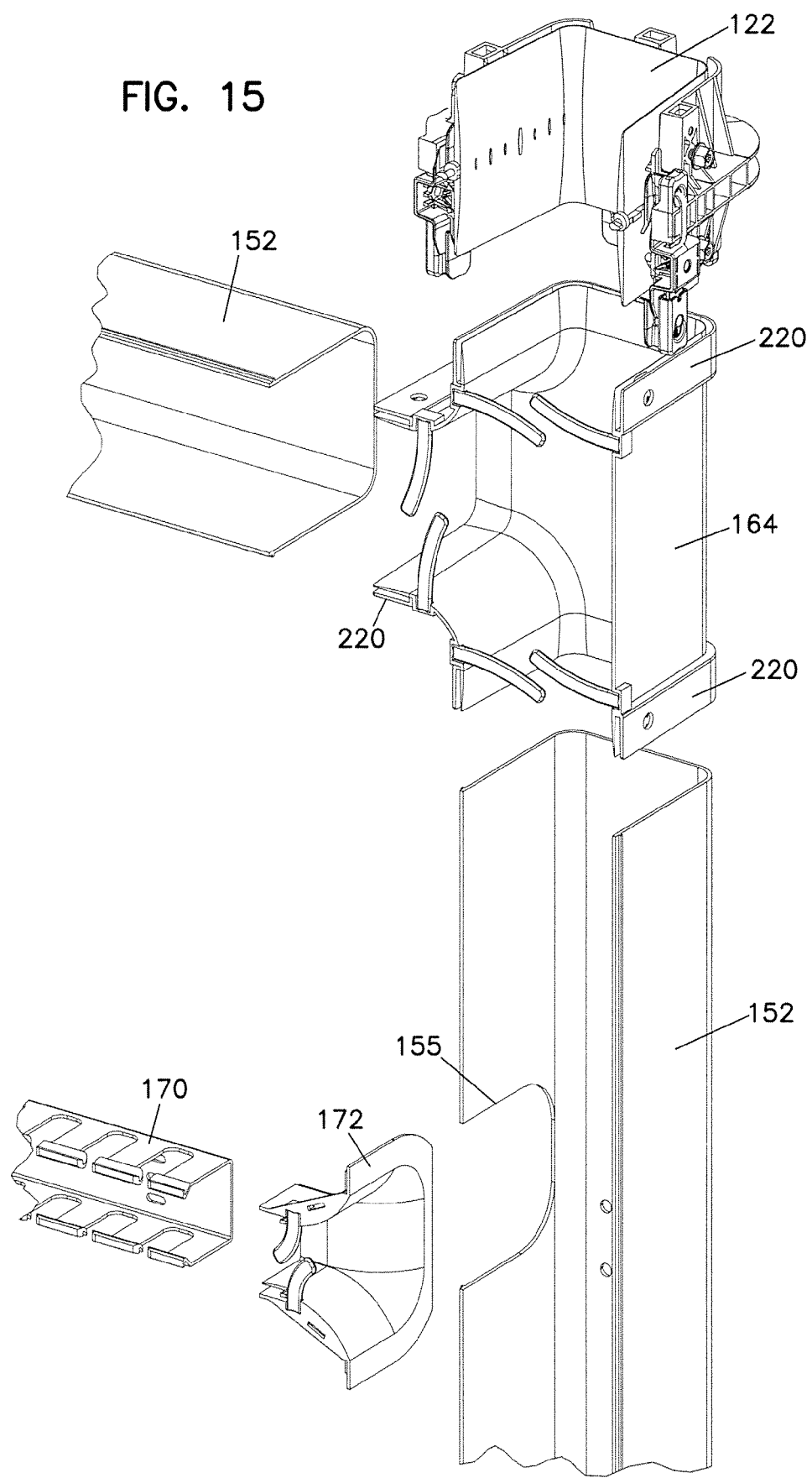
FIG. 15 is an exploded view of a section of a vertical trough portion of the trough system of FIG. 1.

Referring now to FIG. 15, an example method for coupling trough members 152 to fittings 162, 164, 166 is as follows. Terminal end 602 of trough member 152 is inserted into spacing 226 of coupling portion 220 of fitting 162, thereby causing interior surface 608 of trough member 152 to slide along spring members 230 positioned therein. In alternative embodiments, spring members 230 can be positioned in spacing 226 to engage other portions of trough member 152, such as exterior surface 609.

With trough member 152 fully inserted into coupling portion 220 of fitting 162, tabs 266 of spring members 230 engage interior surface 308 of trough member 152 to resist movement of trough member 152 out of coupling portion 220. Additional trough members 152 can be coupled to the other coupling portion 220 of fitting 162 in a similar manner. Fittings 164, 166 function in a similar manner.

An example method for coupling trumpet member 172 to trough member 152 and slotted trough member 170 is as follows. Initially, aperture 155 is formed at the desired location in one of side walls 605, 606 of trough member 152 by, for example, cutting side wall 605 to form aperture 155. Next, space 526 of coupling portion 520 of trumpet member 172 is inserted into aperture 155 so that adjacent portions of side wall 605 forming aperture 155 are received within space 526. With trumpet member 172 fully inserted into aperture 155, tabs 266 of spring members 230 positioned in coupling portion 520 engage side wall 605 of trough member 152 to resist movement of trumpet member 172 out of aperture 155.

Slotted trough member 170 can be coupled to coupling portion 550 by inserting a terminal end of slotted trough member 170 into spacing 556 of coupling portion 550 of trumpet member 172, thereby causing slotted trough member 170 to slide along tabs 266 of spring members 230 positioned therein. With slotted trough member 170 fully inserted into coupling portion 520 of trumpet member 172, tabs 266 of spring members 230 engage slotted trough member 170 to resist movement of trough member 170 out of coupling portion 520.

Referring again to FIGS. 1 and 15, vertical trough portion 150 of trough system 100 can be coupled to horizontal trough portion 110 as follows. One end of fitting 120 is coupled to trough member 112 by coupler 122. The other end of fitting 120 is coupled to another coupler 122 that is, in turn, coupled to fitting 164 using coupling portion 220 of fitting 164. Fitting 118 is coupled between horizontal and vertical trough portions 110, 150 in a similar manner. Other configurations are possible.

With trough system 100 fully assembled, cable can be routed therethrough. Fingers can be coupled to the example fittings and trumpets described herein to help to maintain the cable within trough system 100.

In example embodiments, the fittings and trumpet members of the vertical trough portion can be coupled to the trough members without the use of separate couplers because of the coupling portions that are integrally formed with the fittings and trumpet members. This can result in a reduction in the number of parts and complexity for the system. In addition, this can result in added space within opening 190 of rack 192 for optical equipment and the routing of cable because of the reduction in the number of couplers that can take up space.

In example embodiments, the fittings and trumpet members disclosed herein are tool-less in that the fittings and trumpet members do not require a separate tool to couple the fittings and the trumpet members to the trough members.

In example embodiments, the fittings and trumpet members disclosed herein are auto-locking in that, when the trough member is introduced into the coupling portion of the fitting or trumpet, the spring members of the coupling portion automatically couple the trough member to the fitting or trumpet.

The coupler and trough members disclosed herein are presented by way of example only, and other configurations are possible. For example, although the example trough system disclosed herein is shown with a vertical trough portion with a plurality of fittings, trumpet members, and trough members, in alternative embodiments the fittings, trumpet members, and trough members of the vertical trough portion can be used in a horizontal configuration.

The above specification, examples and data provide a complete description of the manufacture and of the invention. Since many embodiments of the invention can be made without departing from the spirit and scope of the disclosure, the invention resides in the claims hereinafter appended.

What is claimed is:

1. A fitting for a cable trough system, the fitting comprising:
   a bottom wall and two side walls, at least one of the side walls being curved as the side wall extends from a first terminal end to a second terminal end so that a midpoint of an opening defined by the first terminal end is positioned at a 90 degree angle relative to a midpoint of an opening defined by the second terminal end;
   an end portion formed at least one of the first and second terminal ends, the end portion including first and second surfaces defining a space therebetween, the first and second surfaces being generally U-shaped, and the space being sized to receive an end of a trough member of the cable trough system; and
   a spring positioned in the space to engage the terminal end of the trough member to couple the trough member to the fitting, wherein the spring is a leaf spring, and wherein the leaf spring includes cutout tabs that project toward the second surface and are angled into the space.

2. The fitting of claim 1, wherein the fitting is used in a vertical portion of the trough system.

3. The fitting of claim 1, wherein the fitting is an elbow.

4. The fitting of claim 1, wherein the fitting is selected from a group consisting of: up elbows; down elbows; and elbows.

5. The fitting of claim 1, wherein the fitting is selected from a group consisting of: elbows; tees; and crosses.

* * * * *